March 19, 1968 J. W. BARKER, JR 3,374,451

COORDINATE TYPE CROSSBAR SWITCH UTILIZING VARIABLE RELUCTANCE

Filed Oct. 5, 1966 3 Sheets-Sheet 1

INVENTOR
J. W. BARKER, JR
BY E. J. Olinder [signature]
ATTORNEY

United States Patent Office 3,374,451
Patented Mar. 19, 1968

3,374,451

COORDINATE TYPE CROSSBAR SWITCH UTILIZING VARIABLE RELUCTANCE

John W. Barker, Jr., Blacklick, Ohio, assignor to Bell Telephone Laboratories, Incorporated, Berkeley Heights, N.J., a corporation of New York Filed Oct. 5, 1966, Ser. No. 584,476
12 Claims. (Cl. 335—112)

This invention relates to switching circuits and more particularly to automatic selecting switches of the coordinate type.

In the art of telephone switching various approaches have been employed in an effort to effect an ideal compromise among the often conflicting needs of reliability, cost, size, speed, versatility and adaptability for mass production. In the evaluation of any switching arrangement, these needs must in turn be examined in the light of the particular use that is contemplated and in the light of the environmental conditions incident to such use. As yet, no "all-purpose" telephone switching arrangement has been devised and, in view of the wide variety of types of interconnections that must be completed in the course of a telephone call, it would appear that some degree of variety will continue to be essential. Additionally, various types of switching means must be employed to ensure compatibility between older systems, such as step-by-step switching, that must remain in use for economic reasons, and the newer systems, such as electronic switching, that seem to be almost continually evolving in the wake of new scientific discoveries and technical innovations.

Among the telephone switching arrangements now in common use are the crossbar switch such as that disclosed by J. N. Reynolds in U.S. Patent 2,021,329 issued Nov. 19, 1935 and the small enclosed dry-reed switches of the general type described by W. B. Ellwood in U.S. Patent 2,289,830 issued July 14, 1942. One interesting switching arrangement combines certain features of the crossbar switch and certain features of the dry-reed switch in a single system as shown by A. Feiner in U.S. Patent 3,157,747 issued Nov. 17, 1964.

Conventional crossbar switches are essentially bulky and their fabrication involves some undesirable degree of complexity; dry-reed switches, although small and relatively simple to manufacture, lack the contact force required in some switching applications. And the combination of some of the features of both as taught by Feiner, although undoubtedly useful, fails to overcome all of the indicated problems.

Accordingly, the general object of the invention is to increase contact force, enable miniaturization and reduce the cost and complexity of coordinate type switches of the sort that are particularly adaptable for telephone switching applications.

This object and related objects are achieved in accordance with the principles of the invention by a coordinate switching arrangement that fully exploits the principle of variable reluctance. Specifically, the invention utilizes both horizontal and vertical selection for the operation of a selected crosspoint. Crosspoints are established by a combination of vertical and horizontal structures termed units. Each vertical unit includes a "U" shaped frame with a magnet coil at the bottom and a pair of armatures bridging the U at each successive horizontal level. The armatures are held open by light spring hinges. Each armature pair of each vertical unit forms a magnetically parallel path with every other armature pair in that unit and with the magnet coil.

Each horizontal unit includes a pull bar, associated transfer springs and a horizontal select electromagnet. The bar of each horizontal level or unit is operatively connected to one armature, the primary armature of each vertical unit. When the bar is operated by the horizontal electromagnet, each of the associated primary armatures on that level is operated, reducing the reluctance of the magnetic flux path across the air gaps to the corresponding secondary armatures and the corresponding crosspoints are enabled, which is to say that they are placed in an "operate ready" condition. Completion of an enabled crosspoint requires only the application of operating current to the electromagnet of the coresponding vertical unit which fully completes a magnetic circuit path by bringing the secondary or contact carrying armature against its enabled primary armature.

Owing to the unique parallel circuit relation among the armature pairs of each vertical unit, an operated pair provides a magnetic shunt path for every other pair in that vertical unit, thus ensuring isolation for the related connecting circuit path. Such isolation is of particular advantage in certain telephone switching applications as, for example, where an individual subscriber's path is to be connected to a trunk path that is shared noncoincidentally with a number of subscribers.

Another feature of the invention pertains to the fully symmetrical or two-way type of operation that is afforded. Specifically, either the primary or secondary armature may be enabled first. The primary armature is enabled by reducing the reluctance of the potential switch path. The secondary armature is enabled by increasing the flux through it and the associated parallel paths in anticipation of the reluctance of one of these paths being reduced by the movement of a secondary armature.

The principles of the invention as well as additional objects and features thereof will be fully apprehended from the following detailed description of an illustrative embodiment and from the drawing in which.

Figure 1A:
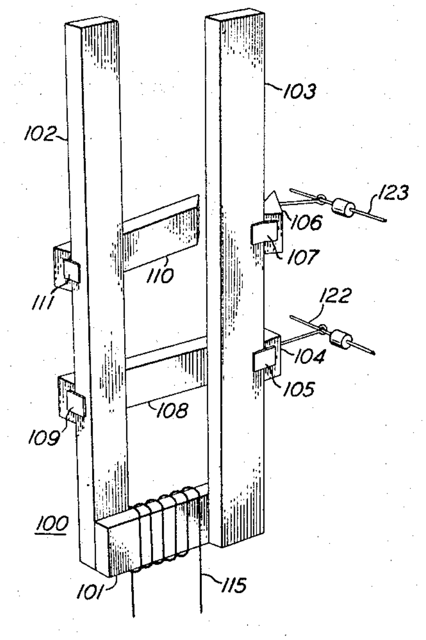
FIG. 1A is a sketch in perspective of the basic operating elements of a switch in accordance with the invention.
Figure 1B:
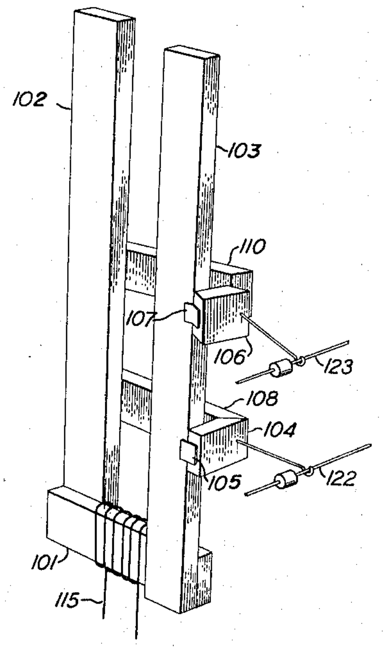
FIG. 1B is a sketch in perspective of the arrangement shown in FIG. 1A showing the opposite side thereof.

The basic structural element of a simplified form of switching arrangement in accordance with the invention, as shown in FIGS. 1A and 1B, is a U shaped frame unit 100 comprising a pair of vertical legs 102 and 103 joined by a crosspiece 101. A coil 115 is wound around the crosspiece 101 to form an electromagnet. Armatures 108 and 110 are pivotally mounted on the leg 102 by the spring hinges 109 and 111, respectively. Similarly, armatures 104 and 106 are pivotally mounted on the leg 103 by spring hinges 105 and 107.

A pull wire 122 and a pull wire 123 are movable in response to the energization of corresponding select electromagnets 210 and 211 (shown in FIG. 2) which serve to pivot the primary armatures 104 and 106 to an operated position. As shown in FIG. 1B, the armatures 106 and 110 are in the unoperated condition and the armatures 104 and 108 are in the operated condition.

Figure 3:
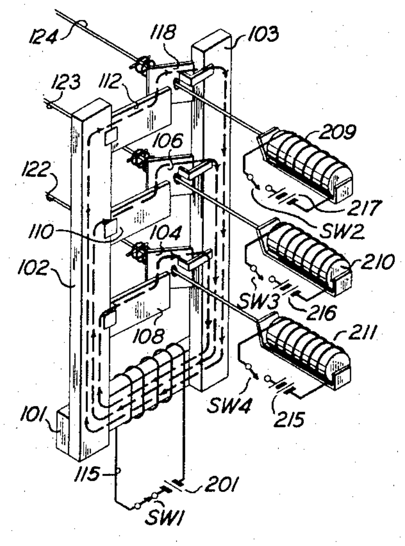
FIGS. 3, 4, 5 and 6 are sketches illustrating successive operating states of a switch in accordance with the invention.

As indicated by the sketch shown in FIG. 3, if a current is applied to the coil 115, the armatures 104 and 108 at horizontal level 1 and the armatures 106 and 110 at horizontal level 2 tend to attract each other. The adjustment of hinge springs 105, 107, 109 and 111 is such, however, that the magnetic force tending to pivot the armatures is less than the forces holding the armatures in the unoperated condition.

A typical operating sequence for a switch unit begins with all of the armatures in the unoperated condition and with no current flowing through the coil 115. When a pull bar, such as pull bar 122, is moved in the direction of the small arrow by the energization of the select magnet 211, shown in FIG. 3, armature 104 is pivoted toward armature 108 which reduces the airgap and the reluctance of the potential magnetic flux path between the two armatures. When the coil 112 is energized, a magnetic flux path is established through the crosspiece 101, up the leg 103, across the armatures 110 and 105 and across the armatures 108 and 104 by way of their associated airgaps, returning to the crosspiece 101 by way of the leg 102. Only the armatures 104 and 108 will close, however, owing to the reduced airgap and the attendant reduction in the reluctance across the airgap caused by the movement of the pull bar 122, as described, in the direction indicated. If the pull bar 122 is then released, the armatures 104 and 108 of horizontal level 1 remain operated, being held in place by the electromagnetic forces created by current flow through the coil 112. No other level, such as horizontal level 2, will operate even if the select wire for that level is moved in the direction indicated, in that the path across the operated armatures 104 and 108 acts as a magnetic flux shunt.

Figure 2:
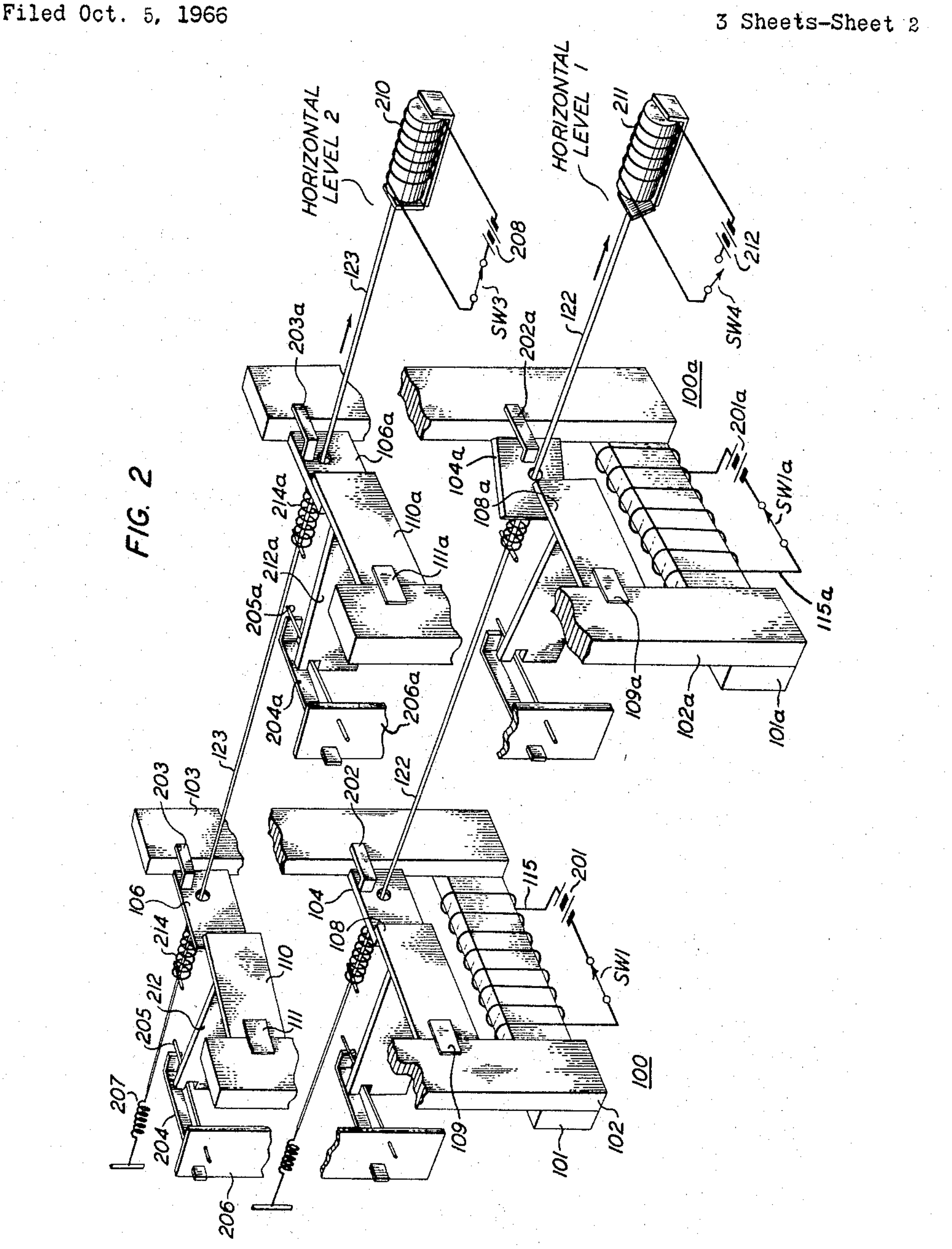
FIG. 2 is a sketch, shown in perspective, of a complete switch in accordance with the invention.

Additional details of construction and operation are illustrated by FIG. 2. FIG. 2 shows a pair of vertical switch units 100 and **100*a*. The individual elements of the vertical unit 100*a* bear the same numerical designators as the corresponding elements in vertical unit 100** with the suffix *a* added thereto. Additional details of the structure shown in FIG. 2 include the fixed contact element 204 and the movable contact element 205 positioned by the contact support 206. A contact operating element 212 is affixed to the secondary armature 110. Similar operating contact assemblies are associated with each secondary armature.

Movement of the pull bar 123 in the direction indicated by the small arrow is translated into a primary armature operating force through the transfer springs 214 and **214*a*. Similar transfer springs are associated with each pull bar. If the switch SW3 of the select electromagnet 210 of horizontal level 2 is opened, a restoring spring 207 returns the pull bar 123** to its unoperated position.

The operating condition illustrated in FIG. 2 is as follows. Switch SW1 is closed so that current from the source 201 is applied to the coil 115. The select electromagnet 211 has been operated so that armatures 104 and 108 are closed. The subsequent release of the pull bar 122 that occurred when switch SW4 was opened, as shown, had no effect on the operated condition of the armatures 104 and 108, owing to the magnetic holding force produced by current flowing in the coil 115. An air gap still separates armatures 106 and 110, however, despite the operation of armature 106 by the pull bar 123 owing to the magnetic flux shunting effect of the closed armatures 104 and 108.

In the vertical unit **100*a* the operating condition of the armature pairs of horizontal level 1 and horizontal level 2 are opposite to that of the armature pairs of vertical unit 100. Armatures 106*a* and 110*a*** are closed inasmuch as both of the switches SW1*a* and SW3 are closed. Armatures **104*a* and 108*a* are open, however, since the pull bar 122 has been released as the select electromagnet 211 returned to its unoperated condition upon the opening of the switch SW4. Additionally, armatures 104*a* and 108*a* are shunted by armatures 106*a* and 110*a***.

FIGS. 3, 4, 5 and 6 show various operating conditions for a three level switch in accordance with the invention. In FIG. 3 the switch SW1 is closed to apply current from the source 201 to the coil 115 thereby establishing the magnetic flux pattern shown by the broken line paths. None of the switches SW2, SW3 or SW4 have been closed, however, and as a result, the select bars 122, 123 and 124 remain unoperated and the corresponding armatures 104, 106 and 118 also remain unoperated.

Figure 4:
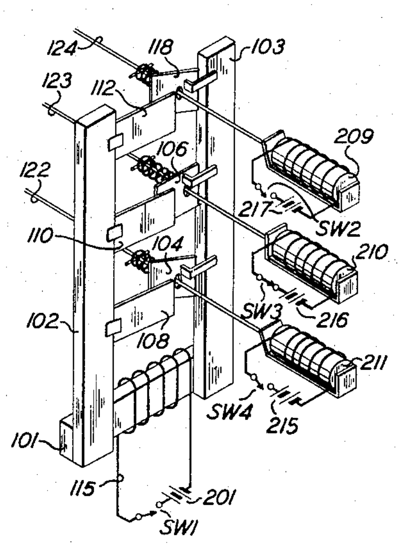

In FIG. 4 pull bar 123 has been moved to the operated position by the closing of the switch SW3 and accordingly armature 106 is shown in the closed or operated position. Switch SW1 remains open, and, as a result, an airgap still remains between armatures 106 and 110 although its magnitude and consequently the magnetic reluctance of the corresponding flux path has been reduced.

Figure 5:
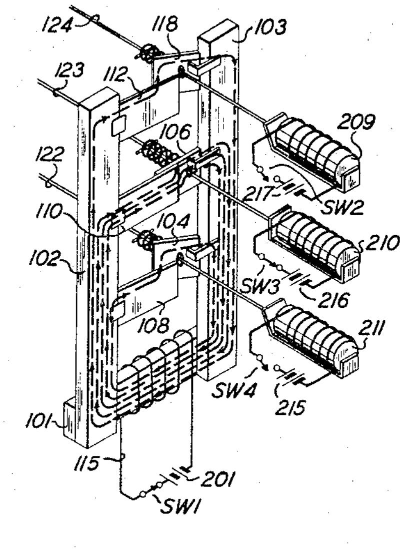
Figure 6:
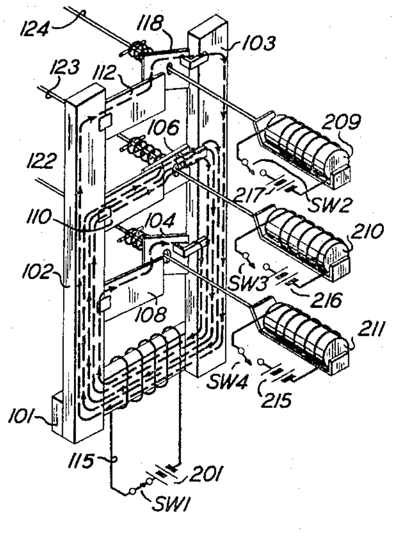

The operated condition of the switch shown in FIG. 4 is changed to that illustrated in FIG. 5 by the closing of switch SW1. Only the armatures 106 and 110 are closed inasmuch as they formed a part of the low reluctance path pointed out in connection with the description of FIG. 4. As illustrated in FIG. 6, no change in the operating condition of the switch as shown in FIG. 5 is effected by opening switch SW3.

It is to be understood that the embodiment described herein is merely illustrative of the principles of the invention. Various modification thereto may be effected by persons skilled in the art without departing from the spirit and scope of the invention.

What is claimed is:

1. A coordinate switch system comprising, in combination, a plurality of crosspoints each including respective first and second armatures, first means responsive to a horizontal selector current for pivoting a selected group of said first armatures into a closed position, thereby reducing the magnetic reluctance in the airgaps at corresponding ones of said crosspoints, second means responsive to a vertical selector current for applying magnetic flux across a selected group of said crosspoints including one of said corresponding crosspoints, whereupon that one of said second armatures corresponding to said last named crosspoint is pivoted to operate current carrying contacts associated therewith, provided that said horizontal selector current and said vertical selector current are applied to said system in coincidence.

2. A coordinate switch system comprising, in combination, a plurality of groups of armature pairs, a plurality of electromagnets of a first kind each being in parallel circuit relation to each of said armature pairs within a respective one of said groups, a plurality of electromagnets of a second kind, one armature of a single pair in each of said groups being operatively responsive to the application of current to a respective one of said electromagnets of said second kind thereby to reduce the magnetic reluctance of the path between said last named pair of armatures whereby, upon the applicator of operating current to one of said electromagnets of said first kind, the other armature of said single pair in said group of pairs corresponding to said last named electromagnet makes conducting contact with its associated armature and circuit contact means operatively responsive to the operation of said other armature.

3. A coordinate switch system comprising, in combination, a plurality of switch points arranged in columns and rows, each of said switch points comprising a first and a second armature, a plurality of first means each responsive to the application of a first operating current for operating all of said first armatures in a respective one of said rows, thereby reducing the magnetic reluctance across said switch points of said last named row, a plurality of second means each responsive to a second operating current for operating all of said second armatures in a respective one of said columns thereby reducing the magnetic reluctance across said switch point of said last named column, whereupon the switch point common to said last named row and to said last named column is closed, providing a magnetic path shunting all other of said switch points in said last named column and precluding the closure of said last named switch points.

4. Apparatus in accordance with claim 3 wherein said first means includes a plurality of first electromagnets.

5. Apparatus in accordance with claim 3 wherein said second means includes a plurality of second electromagnets each in parallel magnetic circuit relation to all of the crosspoints in a corresponding one of said columns.

6. Apparatus in accordance with claim 3 wherein said first means includes a plurality of actuating rods each operatively connected to all of said first armatures in a corresponding one of said rows.

7. Apparatus in accordance with claim 3 wherein each of said columns of switch points includes first and second conducting members each supporting first and second ones of said armatures, respectively, and wherein said second means comprises a plurality of third conducting members each bridged between a respective one of said first and second conducting members and a conducting coil disposed around each of said third conducting members, said second operating current being applied selectively to said coils to effect the operation of a particular one of said crosspoints.

8. A switching system comprising, in combination, a plurality of U-shaped conductive frame members the bottom portion of each of said members forming the core of an electromagnetic structure, a plurality of groups of first armatures, each of said group being pivotally mounted on one leg of a respective one of said members, a plurality of groups of second armatures, each of said last named groups being pivotally mounted on one leg of a respective one of said members in correspondence with said first armatures on the other leg of each of said members, a plurality of operating rods each operatively connected to a corresponding one of said first armatures in each of said groups of first armatures, a plurality of electromagnetic means each operatively associated with a respective one of said rods whereby, upon the application of operating current to one of said electromagnetic means, a corresponding one of said second armatures in each of said frame members is driven toward that one of said first armatures mounted opposite thereto, thereby reducing the magnetic reluctance of the magnetic flux path formed by each corresponding one of said U shaped members, the operated one of said second armatures, and the first armature mounted opposite thereto and the airgap therebetween, whereby, upon the application of operating current to one of said electromagnetic structures, only that one of said first armatures forming a part of a reduced magnetic reluctance path is operated, thereby closing said airgap.

9. Apparatus in accordance with claim 8 including a plurality of circuit contact pairs each being closed by the closure of a respective one of said first armatures.

10. Apparatus in accordance with claim 8 including spring means for returning each of said rods to its unoperated position upon the termination of operating current to the corresponding one of said electromagnetic means.

11. A coordinate switch system comprising, in combination, a plurality of crosspoints arranged in rows and columns, first means for selectively reducing the magnetic reluctance across all of the crosspoints in one of said rows, second means for selectively reducing the magnetic reluctance across all of the crosspoints in one of said columns, whereby a single one of said crosspoints may be operated in response to the selective operation of said first and second means, irrespective of the order of operation of said first and second means, and third means precluding the simultaneous operation of more than one of said crosspoints in any one of said columns.

12. Apparatus in accordance with claim 11 wherein said third means comprises a plurality of pairs of electrically conductive structural members each supporting the structure of said crosspoints in one of said columns, a plurality of single electrically conductive members each bridged between a corresponding one of said pairs thereby shunting all of said crosspoints in a corresponding one of said columns, all of said crosspoints in any one of said columns being in parallel circuit relation with a corresponding one of said single conductive members and a plurality of conductive coils each wound around a respective one of said single conductive members, forming thereby an electromagnet structure.

References Cited

UNITED STATES PATENTS

| | | | |
|---|---|---|---|
| 3,005,877 | 10/1961 | Nitsch | 335—152 |
| 3,157,747 | 11/1964 | Feiner | 335—152 |

BERNARD A. GILHEANY, *Primary Examiner.*

H. BROOME, *Assistant Examiner.*